United States Patent
Kojima et al.

(10) Patent No.: US 7,503,691 B2
(45) Date of Patent: Mar. 17, 2009

(54) MACHINE TOOL

(75) Inventors: Kunio Kojima, Yamanashi (JP); Susumu Maekawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 97 days.

(21) Appl. No.: 11/404,858

(22) Filed: Apr. 17, 2006

(65) Prior Publication Data
US 2006/0247888 A1 Nov. 2, 2006

(30) Foreign Application Priority Data
Apr. 18, 2005 (JP) ............................. 2005-119416

(51) Int. Cl.
*G01K 1/20* (2006.01)
(52) U.S. Cl. .......................... 374/141; 374/57; 374/45
(58) Field of Classification Search .............. 374/9, 374/163, 43, 45, 137, 110, 100, 112, 109, 374/208, 141, 142, 152, 153, 1, 57, 4; 702/58, 702/59, 99; 324/76.11, 500, 513, 522, 754, 324/760, 601
See application file for complete search history.

(56) References Cited

U.S. PATENT DOCUMENTS

| | | | | |
|---|---|---|---|---|
| 4,220,972 A * | 9/1980 | Geokezas et al. | ........... | 348/573 |
| 6,042,265 A * | 3/2000 | Kliman et al. | ............... | 374/152 |
| 6,286,992 B1 * | 9/2001 | Kyrtsos | ........................ | 374/45 |
| 6,590,192 B2 * | 7/2003 | Taino et al. | .................. | 219/710 |
| 6,854,881 B2 * | 2/2005 | Nada | ........................... | 374/169 |
| 6,902,318 B2 * | 6/2005 | Watanabe | .................... | 374/141 |
| 7,048,434 B2 * | 5/2006 | Tregub et al. | .................. | 374/10 |

(Continued)

FOREIGN PATENT DOCUMENTS

JP          03-079256          4/1991

(Continued)

OTHER PUBLICATIONS

European Search Report and Annex dated May 30, 2006 of Application No. EP 06 00 5320.

(Continued)

*Primary Examiner*—Gail Verbitsky
(74) *Attorney, Agent, or Firm*—Staas & Halsey LLP (57) ABSTRACT

A machine tool capable of detecting an ambient temperature change without a detector for detecting the ambient temperature and capable of detecting an abnormality of a temperature detector for detecting the motor temperature. Motor temperature $Ti$ ($i=1, 2 \ldots n$) and the current feedback $Ifi$ of each motor are read out from the temperature detector for detecting the temperature of each motor of the machine tool. The heating value $Qi$ of each motor is obtained from current feedback $Ifi$. Motor temperature $Ti$ is calculated and estimated from the heating value $Q$. Difference $\Delta Ti$ between the estimated motor temperature $Tmi$ and the detected temperature $Tsi$ is obtained. When difference between maximum and minimum values of difference $\Delta Ti$ exceeds the first threshold value $\beta$, a temperature detector abnormality is outputted. When it is equal to or less than the first threshold value $\beta$, the mean value $\Delta T'$ of differences is obtained. If the mean value $\Delta T'$ is equal to or less than the second threshold value $\gamma$, it is determined that there is no abnormality. If it is equal to or more than the second threshold value $\gamma$, the indication that the ambient temperature has been changed is outputted.

4 Claims, 4 Drawing Sheets

U.S. PATENT DOCUMENTS

2003/0185447 A1* 10/2003 Huang et al. .............. 382/218
2007/0047616 A1*  3/2007 Izumiura et al. ........... 374/144
2008/0115487 A1*  5/2008 Harada et al. ............... 60/320

FOREIGN PATENT DOCUMENTS

| JP | 07-059399 | 3/1995 |
| JP | 7-98606 | 4/1995 |
| JP | 10-006183 | 1/1998 |
| JP | 10062266 A * | 3/1998 |
| JP | 2000-135654 | 5/2000 |
| JP | 2003-9563 | 1/2003 |
| WO | 03/051575 | 6/2003 |

OTHER PUBLICATIONS

Office Action mailed on Jun. 3, 2008 and issued in corresponding Japanese Patent Application No. 2005-119416, cited Japanese Patent Publication Nos. 2003-9563 (Reference AG) and 7-98606 (Reference AH).

Office Action mailed on Jun. 3, 2008 and issued in corresponding Japanese Patent Application No. 2005-119416.

* cited by examiner

MACHINE TOOL

BACKGROUND OF THE INVENTION

1. Field of the Invention

The present invention relates to a machine tool, and more specifically to a machine tool capable of detecting a change in ambient temperature of the machine tool and a temperature detector abnormality.

2. Description of Related Art

Compensation for thermal deformation of a machine tool, which measures the ambient temperature of the machine tool and compensates the machine origin position and the like according to the measured temperature, is widely carried out.

For example, the invention that measures the environmental temperature around the machine tool and the temperature of constituents forming the machine tool by using a temperature sensor, obtains a thermal deformation value on the basis of the difference between the measured temperatures and the reference temperature preliminarily obtained, and calculates a machine origin shift amount on the basis of the thermal deformation value has been well known (see JP 3-79256A).

There is another well-known invention that sets as reference temperature the temperature measured by a temperature sensor disposed in a bed in which there are not many changes in temperature, deducts the reference temperature from the temperature measured by a temperature sensor disposed in a heat-generating portion of a spindle or spindle head to obtain a temperature rise value, and adds a preset temperature shift value to the temperature rise value to calculate a shift temperature rise value, obtains a provisional compensation value from the shift temperature rise value and a temperature-compensation amount relationship table, and multiplies the provisional compensation amount by a compensation coefficient of the target spindle to obtain a thermal deformation compensation amount of the target spindle (see JP 10-6183A).

Furthermore, a device for calculating a thermal deformation amount of a machine tool, in which thermal events, such as room temperature change, operation heat, and machining heat, are measured to store the degree of the thermal events in addition to occurrence time, and a remaining thermal deformation amount is obtained from the stored data and an elapsed time coefficient preliminarily obtained by experiment or calculation, has been also well-known (see JP 2000-135654A).

Moreover, a recent motor (servomotor and spindle motor) is provided in its inside with a temperature detector for detecting the temperature of the motor itself and performing a temperature compensation with respect to a secondary resistance value. As a heating value caused by motor drive current is proportional to the square of a feedback value of the drive current, the heating value can be calculated from the current feedback amount. Additionally, it is known that the relationship between the heating value and the motor temperature is preliminarily obtained, and the motor temperature can be calculated and estimated from the heating value calculated on the basis of this relationship formula (see JP 7-59399A).

As described above, in conventional machine tools, the temperature detector is disposed in the inside or outside of each of the machine tools, to thereby measure the ambient temperature. Depending on a surrounding environment including the position, space or the like where the temperature detector is installed, a countermeasure, such as addition of a cover, is required in order to protect the temperature detector against a coolant, swarf and the like, which increases costs.

SUMMARY OF THE INVENTION

The present invention provides a machine tool capable of detecting an ambient temperature change without a detector for detecting ambient temperature, and moreover of detecting an abnormality of a temperature detector for detecting motor temperature.

A machine tool of the present invention has at least one motor to be driven for machining. The machine tool comprises: a temperature detector for detecting temperature of the motor; current detecting means for detecting a current value of the motor; motor temperature estimating means for estimating the temperature of the motor based on the current value of the motor detected by the current detecting means; and abnormality detecting means for detecting an abnormality of an ambient temperature change or an abnormality of the temperature detector based on a comparison between the detected temperature of the motor by the temperature detector and the estimated temperature of the motor by the motor temperature estimation means.

The machine tool may have two motors to be driven for machining. Each of the two motors may be provided with the temperature detector, the current detecting means and the motor temperature estimating means, and the abnormality detecting means may obtain a difference between the detected temperature and the estimated temperature of each of the two motors, and may determine an abnormality of the ambient temperature change when both of the obtained differences exceed a threshold value, and an abnormality of the temperature detector when only one of the obtained differences exceeds the threshold value.

The machine tool may have a plurality of motors to be driven for machining. Each of the plurality of motors may be provided with the temperature detector, the current detecting means and the motor temperature estimating means, and the abnormality detecting means may obtain an absolute value of a difference between the detected temperature and the estimated temperature of each of the plurality of motors, and may determine an abnormality of the temperature detector when a difference between a maximum and a minimum of the obtained absolute values exceeds a first threshold.

Further, the abnormality detecting means may obtain an absolute value of a difference between the detected temperature and the estimated temperature of each of the plurality of motors, and may determine an abnormality of the ambient temperature change when an average of the obtained absolute values exceeds a second threshold.

The motor temperature estimating means may estimate the temperature of the motor according to a predetermined equation.

With the above configuration, installation of the temperature detector for measuring the ambient temperature of the machine tool is not required, and there is no influence of a coolant, swarf and the like, so that the ambient temperature change can be detected at low cost without degrading reliability of ambient temperature detection. It is also possible to detect an abnormality of the temperature detector for detecting the motor temperature.

DETAILED DESCRIPTION

The present invention detects an ambient temperature change of a machine tool by using a temperature detector for detecting motor temperature, which is installed in a motor, without a temperature detector for measuring the ambient temperature of the machine tool. If the ambient temperature is constant, temperature detected by the motor temperature detector and estimated temperature obtained from drive current of the motor coincide with each other.

Figure 2A:
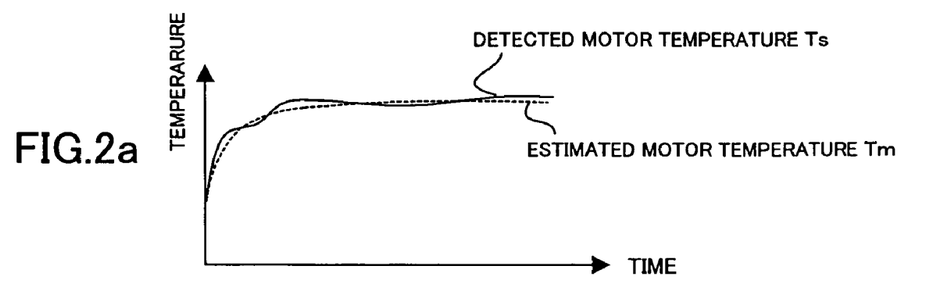
FIGS. 2a to 2c are explanatory views for explaining an operation principle of the present invention.

FIG. 2a shows with a graph temperature (solid line) Ts detected by a temperature detector for detecting the motor temperature and temperature (broken line) Tm estimated from the motor drive current in a state where there is no change in the ambient temperature of the machine tool. The temperature Ts detected by the temperature detector and the temperature Tm estimated from the drive current rise as heat generation is greatened after the motor is driven. The two temperatures are virtually the same temperatures.

Figure 2B:
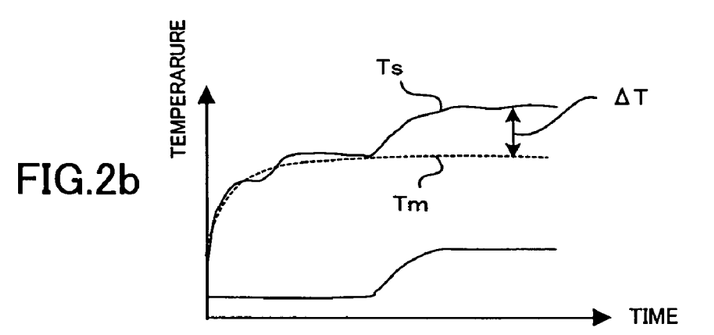

When the ambient temperature is changed, as shown in FIG. 2b, although the detected temperature Ts and the estimated temperature Tm are about the same temperatures before the change, the temperature Ts detected by the temperature detector is changed, and difference ΔT in relation to the estimated temperature Tm is increased due to the ambient temperature change.

Figure 2C:
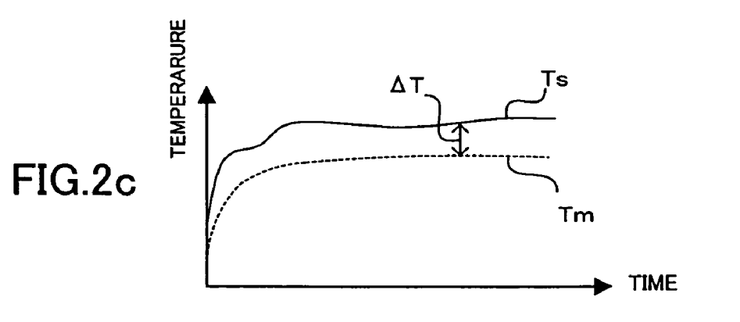

If the temperature detector for detecting the motor temperature has an abnormality, as shown in FIG. 2c, the difference ΔT between the detected temperature Ts and the estimated temperature Tm occurs from a point when the motor starts to be driven. This makes it possible to detect a temperature detector abnormality. However, if there is generated an abnormality in the temperature detector while the motor is driven, the temperature difference ΔT occurs in the middle thereof as shown in FIG. 2b, and it is impossible to distinguish between an ambient temperature change and a temperature detector abnormality. In either case, however, it can be known as abnormality occurrence.

A few embodiments of the present invention will be described below.

Figure 1:
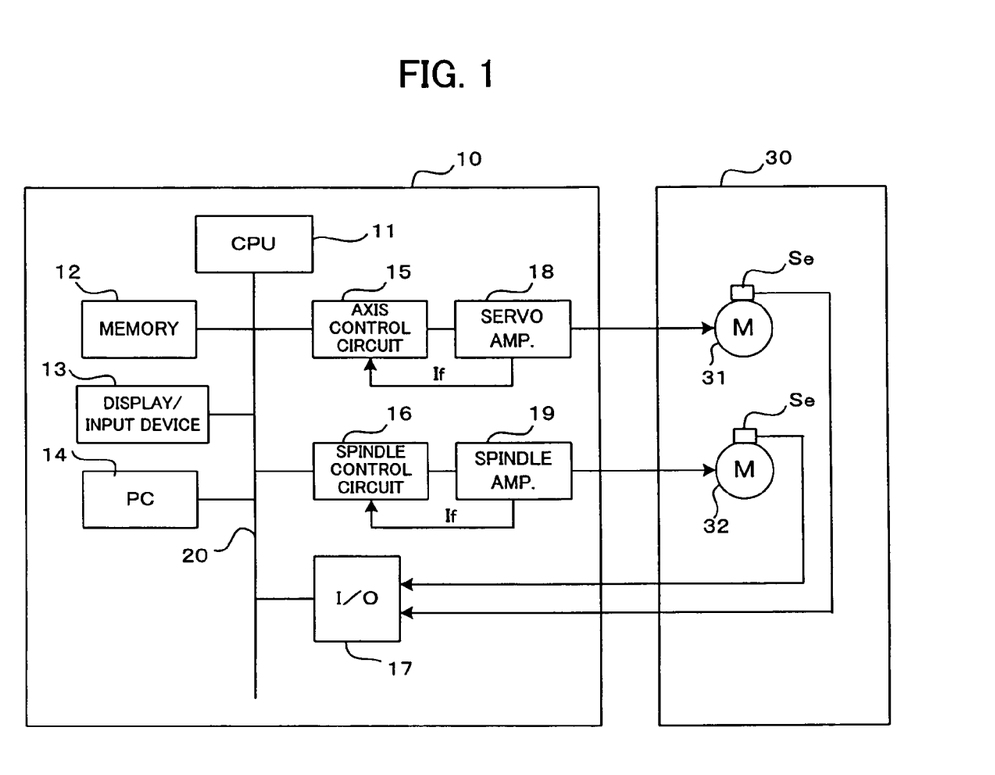
FIG. 1 is a schematic view showing a substantial portion of a machine tool that constitutes an embodiment of the present invention.

FIG. 1 is a schematic view of a machine tool that constitutes each embodiment of the present invention. Hardware of the machine tool is identical to that of a conventional machine tool, so that only the scheme thereof is schematically illustrated. Difference from the conventional machine tool is that software for detecting an abnormality of the temperature detector for detecting an ambient temperature change in the machine tool and motor temperature is accommodated in a memory of a controller for controlling the machine tool.

Reference numeral 30 denotes a mechanism of a machine tool, and reference numeral 10 denotes a numerical controller for controlling the mechanism 30 of the machine tool. The numerical controller 10 has a processor 11 and configures a CNC. Connected to the processor 11 through a bus 20 are a memory 12, such as a ROM, a RAM, and nonvolatile RAM, a display/input device 13 made up of a display and input means including a keyboard, a mouse, and the like, a PC (programmable controller) 14 that performs sequence control of the machine tool, and the like, an axis control circuit (FIG. 1 shows only an axis control circuit for one shaft and a servomotor) 15 for controlling a servomotor that drives each feed shaft of the machine tool, a spindle control circuit 16 for controlling a spindle motor that drives a spindle, and a input/output circuit 17. A servomotor M is connected through a servo amplifier 18 to the axis control circuit 15. A spindle motor 32 is connected through a spindle amplifier 19 to the spindle control circuit 16. The input/output circuit 17 is inputted with detected temperatures outputted from temperature detectors Se for detecting motor temperatures, which are disposed in the respective motors 31 and 32 of the feed shafts and spindle of the machine tool.

The processor 11 controls the machine tool according to a system program stored in a memory, and drive-controls the motors 32 and 31 of the spindle and feed shafts to carry out the machining according to a machining program stored in the memory 12. The axis control circuit 15 of each shaft performs position, velocity and current loop control processing according to a motion command issued from the processor 11, position and velocity feedback from a position/velocity detector, not shown, disposed in each servomotor, and current feedback If feedbacked from current detection means, not shown, located in the servo amplifier, to thereby drive-control each servomotor 31 by using the servo amplifier 18. The spindle control circuit also performs velocity and current loop control processing according to a velocity command issued from the processor 11, feedback from a position coder for detecting spindle position and velocity, not shown, and current feedback If feedbacked from current detection means, not shown, located in the spindle amplifier, to thereby drive-control the spindle motor 32 by using the spindle amplifier 19. The control of each axis servomotor and the control of the spindle motor are the same as conventional controls. The processor 11 is capable of reading the current feedback If from each current detection means through the axis control circuit 15 and the spindle control circuit 16.

Figure 3:
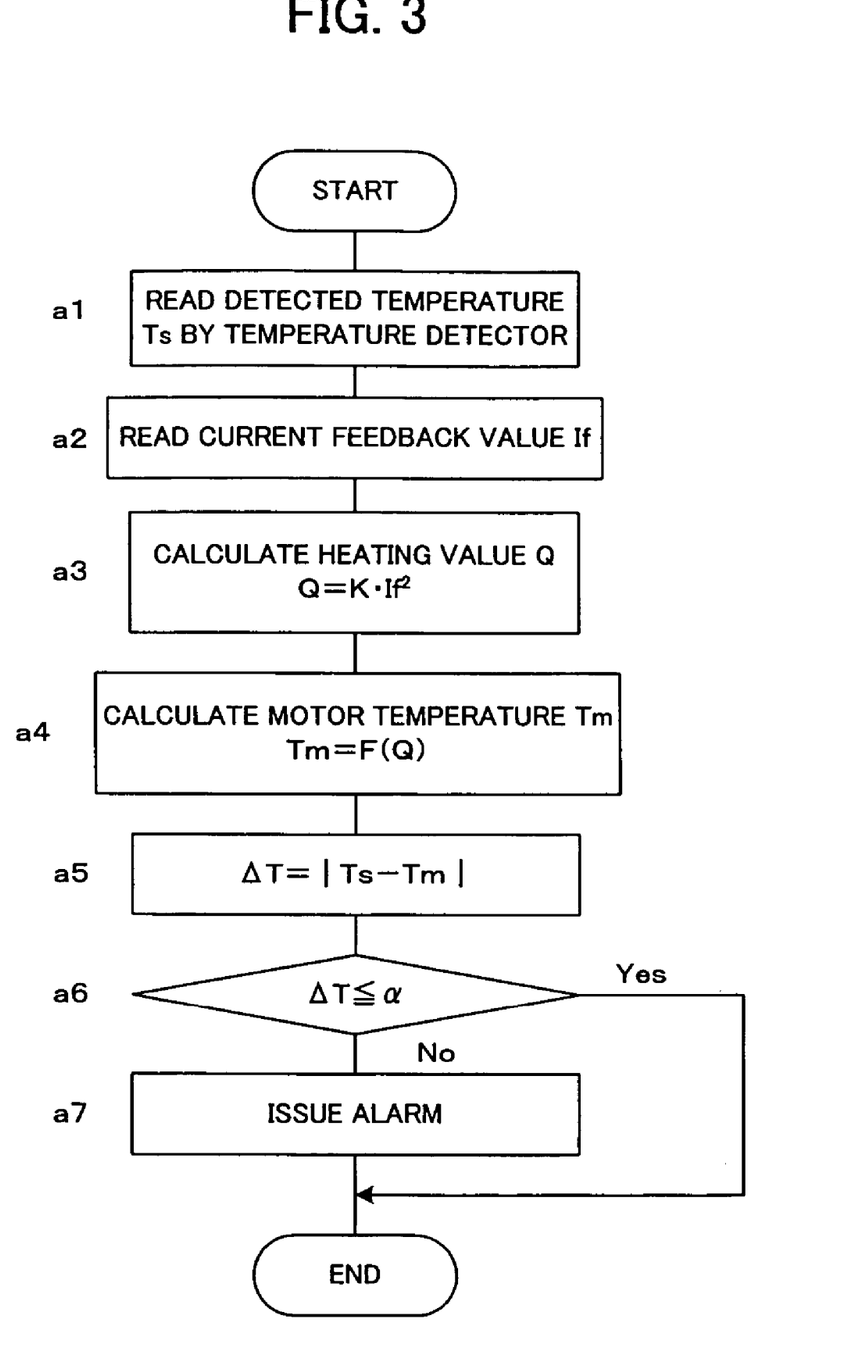
FIG. 3 is a flowchart showing an algorithm for a temperature abnormality detection process in a first embodiment of the present invention.

FIG. 3 is a flowchart showing a temperature abnormality detection process of a first embodiment of the present invention. The processor 11 of the numerical controller 10 carries out the process shown in FIG. 3 in every prescribed cycle. In the first embodiment, an ambient temperature change is chiefly detected. Any one of the servomotors that drive the feed shafts of the machine tool and the spindle motor that drives the spindle is selected as representative, and the ambient temperature change is chiefly detected on the basis of difference between the motor temperature Tm estimated from the drive current of the motor and the temperature Ts detected by the temperature detector Se disposed in the motor.

First, the temperature Ts detected by the temperature detector Se arranged at the motor (31 or 32 or the like) is read out (Step a1). Moreover, the current feedback If that is the drive current of the motor is read out (Step a2). A heating value $Q=K \cdot If_2$ is calculated using the current feedback If that has been read out (Step a3). Since it is known that the motor temperature Tm is a function of the heating value Q, the motor temperature Tm is obtained by substituting the heating value obtained in Step a3 for the calculation formula Tm=f(Q) for obtaining the motor temperature T from the heating value Q (Step a4). In respect to obtaining the motor temperature Tm from the heating value Q, the motor temperature Tm can be obtained by obtaining coil temperature from the heating value Q and multiplying the coil temperature by a coefficient on the basis of a function for obtaining coil temperature from a heating value, which is disclosed in Unexamined Japanese Patent Application Publication No. 7-59399.

An absolute value of difference between the estimated motor temperature Tm obtained in Step a4 and the detected temperature Ts detected in Step a1 is obtained as temperature difference $\Delta T=|Tm-Ts|$ (Step a5).

A determination is made as to whether the temperature difference $\Delta T$ is equal to or less than a threshold value $\alpha$ (Step a6). If the temperature difference $\Delta T$ is equal to or less than the threshold value $\alpha$, the process of the current cycle is terminated. Subsequently, the process from Step a1 to Step a6 is repeatedly implemented in every prescribed cycle. If Step a6, however, determines that the temperature difference $\Delta T$ exceeds the threshold value $\alpha$, an alarm is issued, and a warning that informs an ambient temperature change or the like is displayed on a screen or the like of the display/input device 13 (Step a7).

In case that the machine tool is operated, and the alarm outputted in Step a7 is given in the middle of the operation, as stated above, the alarm is generated due to the ambient temperature change as shown in FIG. 2b. The alarm generation informs the operator that the ambient temperature is changed. In case that the alarm outputted in Step a7 is given in an initial stage of start of the machine tool operation, it can be inferred that the temperature detector has an abnormality as shown in FIG. 2c.

As described, one of the motors is selected as representative, and the ambient temperature change can be chiefly detected from the temperature Ts detected by the temperature detector fixed to the motor and the motor temperature Tm estimated from the motor drive current (current feedback) If. From the initial stage of start of the machine tool operation, a temperature detector abnormality can be suspected and detected only when an alarm is generated. However, if the temperature detector has an abnormality in the middle of the machine tool operation, an alarm is similarly generated, which produces the problem that it is impossible to clearly distinguish only from the alarm between a temperature detector abnormality and an ambient temperature change.

Therefore, the temperature abnormality detection process shown in FIG. 3 is implemented with respect to two motors that drive the feed shaft and the spindle of the machine tool. If the ambient temperature is changed, a substantially simultaneous alarm is generated by the temperature abnormality detection process shown in FIG. 3 with respect to two or more motors, so that the ambient temperature change can be detected. It is unlikely that two temperature detectors have abnormalities at the same time. Accordingly, when the alarm is generated in either one of the motors, it is possible to detect that the temperature detector of this particular motor has an abnormality.

For example, if the temperature abnormality detection process shown in FIG. 3 is carried out with respect to all the motors that drive the feed shafts and the spindle of the machine tool, in case that an alarm is generated in one of the temperature abnormality detection processes, and no alarm is given in the others, it can be determined that the temperature detector of this particular motor has an abnormality. If alarms are generated in most of the temperature abnormality detection processes of the other motors, it can be detected as an ambient temperature change.

Figure 4:
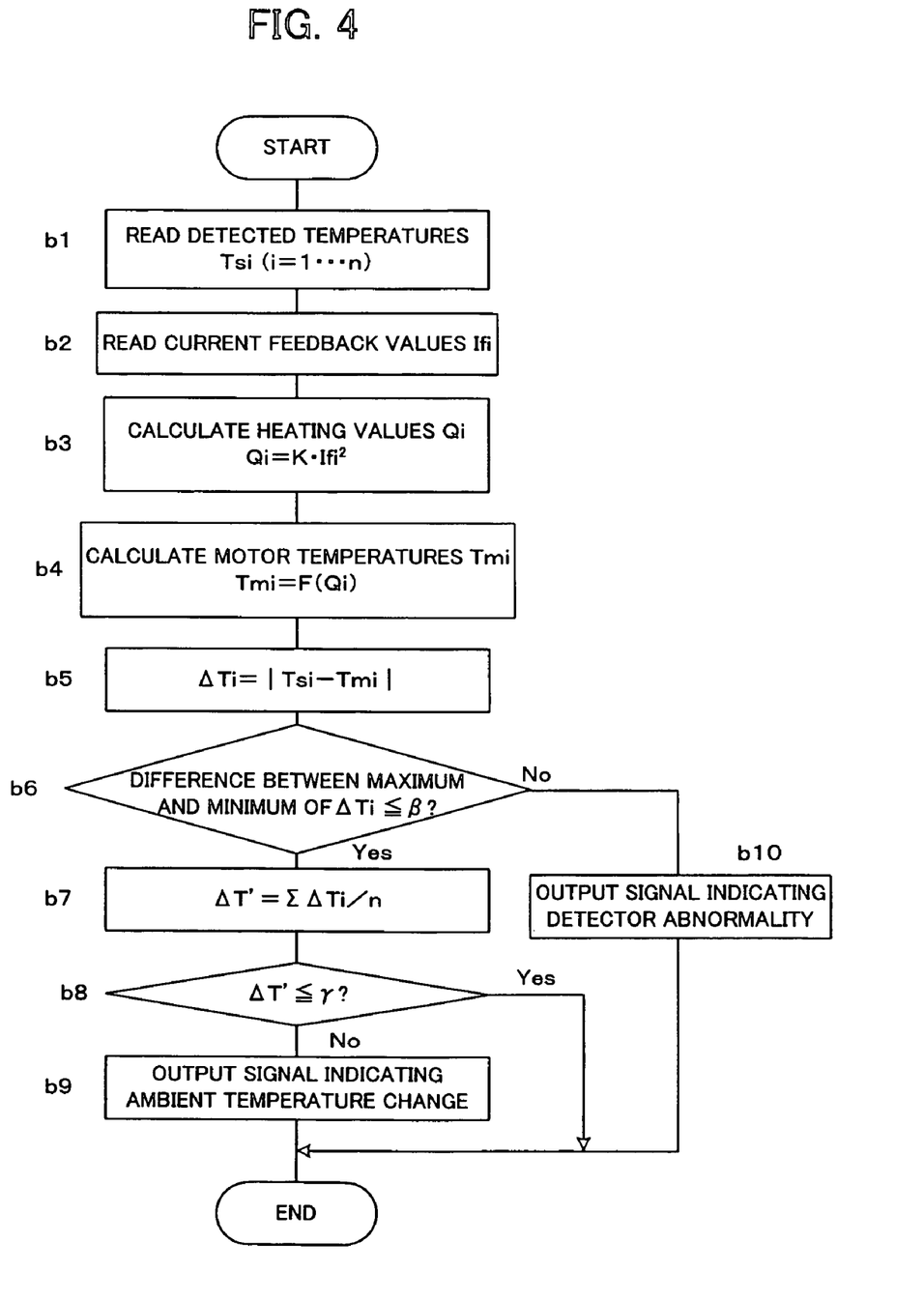
FIG. 4 is a flowchart showing an algorithm for a temperature abnormality detection process in a second embodiment of the present invention.

FIG. 4 is a flowchart showing a temperature abnormality detection process of a second embodiment of the present invention. The processor 11 of the numerical controller 10 implements the process shown in FIG. 4 in every prescribed cycle. In the second embodiment, the ambient temperature change in the machine tool and the abnormality of the temperature detector for detecting the motor temperature are detected in distinction from each other.

The second embodiment detects abnormalities of the temperature detectors disposed in the servomotors for driving the feed shafts and the spindle motor and an ambient temperature change.

First, temperatures Tsi (where i=1, 2 . . . n, which means Ts1 to Tsn) detected by the temperature detectors Se arranged at the respective motors are read out (Step b1). The number of the motors and the temperature detectors is n. In the next place, the current feedback values Ifi that are drive currents of respective motors are read out (Step b2). Based on the read current feedback values Ifi, heating values $Qi=K \cdot Ifi^2$ are calculated (Step b3). Based on the heating values Qi, the motor temperatures Tmi are obtained according to the calculation equation for obtaining the motor temperature from the heating value (Step b4).

An absolute value of difference between the estimated motor temperature Tmi obtained in Step a4 and the detected temperature Tsi detected in Step a1 is obtained as temperature difference $\Delta Ti=|Tmi-Tsi|$ (Step b5).

A determination is made as to whether a difference between a maximum value and a minimum value of the temperature differences $\Delta Ti$ is equal to or less than a first threshold value $\beta$(Step b6). If the difference exceeds the first threshold value $\beta$, this means that there is dispersion in the detected temperature difference $\Delta Ti$. When an ambient temperature change is cause therefor, temperature differences with respect to all the motors become substantially the same temperature differences by equivalently receiving an influence of the ambient temperature. In this case, an alarm indicative of temperature detector abnormality is outputted and displayed on the screen of the display/input device 13 (Step b10). In this case, the detected temperatures detected by all the temperature detectors are displayed so that the temperature detector having an abnormality can be identified.

If Step b6 determines that the difference between the maximum value and the minimum value of the temperature difference $\Delta Ti$ is equal to or less than the first threshold value $\beta$, a mean value $\Delta T'$ ($=\Sigma \Delta Ti/n$) of the temperature difference $\Delta Ti$ is obtained (Step b7), and a determination is made as to whether the mean value $\Delta T'$ is equal to or less than a second threshold value $\gamma$ (Step b8).

If the mean value $\Delta T'$ is equal to or less than the second threshold value $\gamma$, the process of the current cycle is terminated. If the mean value $\Delta T'$ exceeds the second threshold value $\gamma$, however, a signal indicative of an ambient temperature change is outputted, and indication informing that the ambient temperature has been changed is displayed on the screen of the display/input device 13 (Step b9).

As stated above, in the second embodiment, it is possible to detect an abnormality in the temperature detector for detecting the motor temperature and an ambient temperature change in the machine tool, in distinction from each other.

In each of the above-described embodiments, the heating value Q is obtained from the current feedback If value, and the motor temperature Tm is obtained by the calculation formula for obtaining the motor temperature Tm from the heating value Q. It is also possible, however, to preliminarily measure the motor temperature Tm with respect to each heating value Q obtained from the motor drive current (current feedback value) beforehand, store the motor temperature Tm in a table provided to the memory 12 as data with respect to each heating value Q, and obtain the motor temperature Tm from the stored data of the table, instead of obtaining the motor temperature Tm from the heating value Q by the calculation formula, in Step a4 that performs the process shown in FIG. 3 and Step b4 that performs the process shown in FIG. 4.

What is claimed is:

1. A machine tool having at least one motor to be driven for machining, comprising:
    a temperature detector for detecting temperature of the motor;
    current detecting means for detecting a current value of the motor;
    motor temperature estimating means for estimating the temperature of the motor based on the current value of the motor detected by said current detecting means; and
    abnormality detecting means for detecting an abnormality of an ambient temperature change or an abnormality of said temperature detector, based on a comparison between the detected temperature of the motor by said temperature detector and the estimated temperature of the motor by said motor temperature estimating means and determining whether a difference therebetween is equal to, or less than, a first threshold,
    wherein the machine tool has two motors to be driven for machining,
    each of the two motors is provided with a respective said temperature detector, said current detecting means and said motor temperature estimating means, and
    said abnormality detecting means obtains a difference between the detected temperature and the estimated temperature of each of the two motors, and determines an abnormality of the ambient temperature change when both of the obtained differences exceed the first threshold value, and an abnormality of the temperature detector when only one of the obtained differences exceeds the first threshold value.

2. A machine tool having at least one motor to be driven for machining, comprising:
    a temperature detector for detecting temperature of the motor;
    current detecting means for detecting a current value of the motor;
    motor temperature estimating means for estimating the temperature of the motor based on the current value of the motor detected by said current detecting means; and
    abnormality detecting means for detecting an abnormality of an ambient temperature change or an abnormality of said temperature detector, based on a comparison between the detected temperature of the motor by said temperature detector and the estimated temperature of the motor by said motor temperature estimating means and determining whether a difference therebetween is equal to, or less than, a first threshold,
    wherein the machine tool has a plurality of motors to be driven for machining,
    each of the plurality of motors is provided with a respective said temperature detector, said current detecting means and said motor temperature estimating means, and
    said abnormality detecting means obtains an absolute value of a difference between the detected temperature and the estimated temperature of each of the plurality of motors, and determines an abnormality of the temperature detector when a difference between a maximum and a minimum of the obtained absolute values exceeds the first threshold.

3. A machine tool having at least one motor to be driven for machining, comprising:
    a temperature detector for detecting temperature of the motor;
    current detecting means for detecting a current value of the motor;
    motor temperature estimating means for estimating the temperature of the motor based on the current value of the motor detected by said current detecting means; and
    abnormality detecting means for detecting an abnormality of an ambient temperature change or an abnormality of said temperature detector, based on a comparison between the detected temperature of the motor by said temperature detector and the estimated temperature of the motor by said motor temperature estimating means and determining whether a difference therebetween is equal to, or less than, a first threshold,
    wherein the machine tool has a plurality of motors to be driven for machining and a plurality of temperature detectors respectively associated with the plurality of motors,
    each of the plurality of motors is provided with a respective said temperature detector, said current detecting means and said motor temperature estimation means; and
    said abnormality detecting means obtains an absolute value of a difference between the detected temperature and the estimated temperature of each of the plurality of motors, and determines an abnormality of the ambient temperature change when an average of the obtained absolute values exceeds a second threshold.

4. A machine tool according to claim 1, wherein said motor temperature estimating means estimates the temperature of the motor according to a predetermined equation.

* * * * *

UNITED STATES PATENT AND TRADEMARK OFFICE
CERTIFICATE OF CORRECTION

PATENT NO. : 7,503,691 B2  Page 1 of 1
APPLICATION NO. : 11/404858
DATED : March 17, 2009
INVENTOR(S) : Kunio Kojima et al.

It is certified that error appears in the above-identified patent and that said Letters Patent is hereby corrected as shown below:

Title page, Column 2 (Abstract), Line 12, change "When difference" to --When a difference--.

Sheet 2 of 4 (Vertical Axis) (FIG. 2A), Line 1, change "TEMPERARURE" to --TEMPERATURE--.

Sheet 2 of 4 (Vertical Axis) (FIG. 2B), Line 1, change "TEMPERARURE" to --TEMPERATURE--.

Sheet 2 of 4 (Vertical Axis) (FIG. 2C), Line 1, change "TEMPERARURE" to --TEMPERATURE--.

Column 8, Line 36, change "estimation means;" to --estimation means,--.

Signed and Sealed this

Eighth Day of September, 2009

David J. Kappos
*Director of the United States Patent and Trademark Office*